(12) United States Patent
Blais-Morin et al.

(10) Patent No.: US 7,986,358 B1
(45) Date of Patent: Jul. 26, 2011

(54) BAYER IMAGE CONVERSION USING A GRAPHICS PROCESSING UNIT

(75) Inventors: Louis-Antoine Blais-Morin, Montreal (CA); Stéphane Baldo, Montreal (CA); Guillaume Cottinet, Lasalle (CA)

(73) Assignee: Matrox Electronic Systems, Ltd., Dorval, Quebec (CA)

( * ) Notice: Subject to any disclaimer, the term of this patent is extended or adjusted under 35 U.S.C. 154(b) by 1047 days.

(21) Appl. No.: 10/372,764

(22) Filed: Feb. 25, 2003

(51) Int. Cl.
*H04N 9/083* (2006.01)
*H04N 3/14* (2006.01)

(52) U.S. Cl. .................... 348/273; 348/280; 382/217

(58) Field of Classification Search .................. 348/273, 348/280, 234–238
See application file for complete search history.

(56) References Cited

U.S. PATENT DOCUMENTS

| | | | |
|---|---|---|---|
| 3,971,065 A | 7/1976 | Bayer | |
| 7,139,022 B1 * | 11/2006 | Raffy | 348/273 |
| 7,158,178 B1 * | 1/2007 | Acharya | 348/280 |
| 2001/0050691 A1 * | 12/2001 | Komata | 345/667 |
| 2002/0101524 A1 * | 8/2002 | Acharya | 348/273 |
| 2002/0159656 A1 * | 10/2002 | Matsuki et al. | 382/305 |
| 2003/0071823 A1 * | 4/2003 | Fukasawa | 345/589 |
| 2003/0164840 A1 * | 9/2003 | O'Driscoll | 345/611 |
| 2003/0206174 A1 * | 11/2003 | MacInnis et al. | 345/560 |
| 2004/0109563 A1 * | 6/2004 | Evans et al. | 380/227 |
| 2006/0146188 A1 * | 7/2006 | Estrop | 348/448 |

* cited by examiner

*Primary Examiner* — Hung H Lam
(74) *Attorney, Agent, or Firm* — Norton Rose OR LLP

(57) ABSTRACT

A single-site color image, such as a Bayer CCD image, is converted to a color space image using the resource of a Graphics Processing Unit (GPU). The Bayer image is loaded into the GPU along with commands to cause the texture engine in the GPU to use the Bayer image as a source texture and to compute, for each pixel in a destination image having same dimensions as the single-site color camera image, interpolated neighbor pixel values from the single-site color camera image for the remainder of said colors. A code image can be used to provide, for each pixel in the destination image, a value for each combination of color space image color and each Bayer image color. Each pixel is then computed as a sum of a product of each code image. value and a corresponding value selected from the corresponding source texture pixels and an interpolation of neighboring source texture pixels.

14 Claims, 12 Drawing Sheets

Generation of Bayer code data array

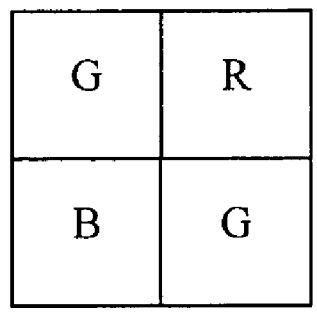
Fig1: example of a Bayer Pattern
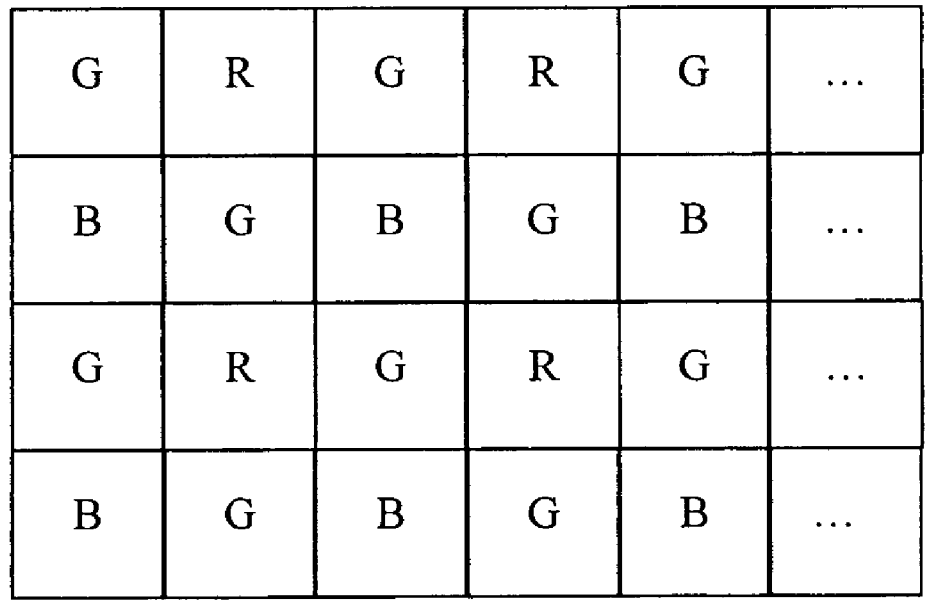
Fig.2: example of a Bayer image

| $X_{i-1,j-1}$ | $X_{i,j-1}$ | $X_{i+1,j-1}$ |
|---|---|---|
| $X_{i-1,j}$ | $X_{i,j}$ | $X_{i+1,j}$ |
| $X_{i-1,j+1}$ | $X_{i,j+1}$ | $X_{i+1,j+1}$ |

Array element $X_{i,j}$ and its neighbors

Compute $Y = f(X_{i,j}, X_{i-1,j-1}, X_{i-1,j}, X_{i-1,j+1}, X_{i,j-1}, X_{i,j+1}, X_{i+1,j-1}, X_{i+1,j}, X_{i+1,j+1})$ Where f design a combination of

|  |  |  |
|---|---|---|
|  | $Y_{i,j}$ |  |
|  |  |  |

*Fig. 4: Texture mapping*

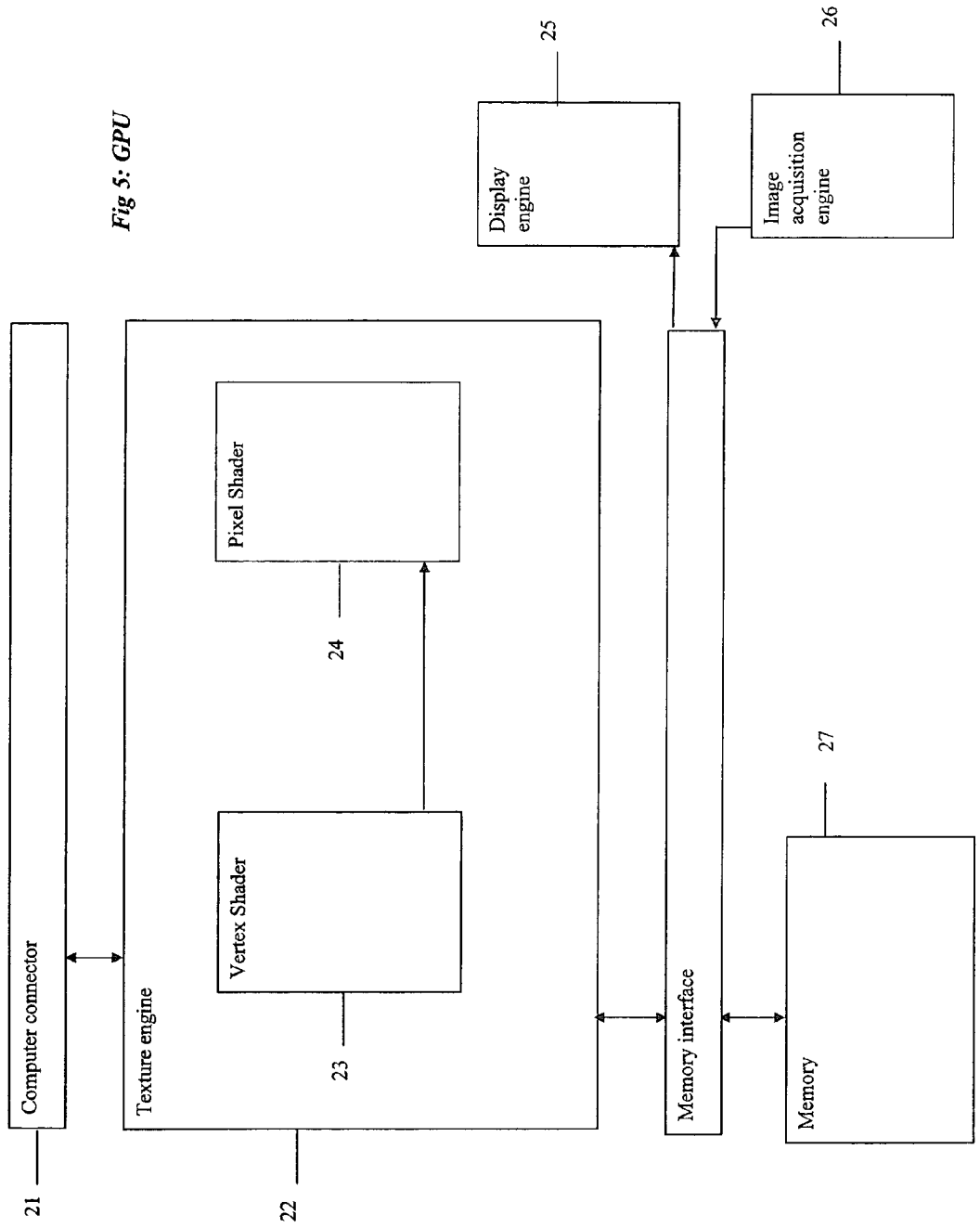
Fig 5: GPU

| $G_1$ | R | $G_1$ | R | $G_1$ | R | $G_1$ | R | $G_1$ | R | $G_1$ | R |
|---|---|---|---|---|---|---|---|---|---|---|---|
| B | $G_2$ | B | $G_2$ | B | $G_2$ | B | $G_2$ | B | $G_2$ | B | $G_2$ |
| $G_1$ | R | $G_1$ | R | $G_1$ | R | $G_1$ | R | $G_1$ | R | $G_1$ | R |
| B | $G_2$ | B | $G_2$ | B | $G_2$ | B | $G_2$ | B | $G_2$ | B | $G_2$ |
| $G_1$ | R | $G_1$ | R | $G_1$ | R | $G_1$ | R | $G_1$ | R | $G_1$ | R |
| B | $G_2$ | B | $G_2$ | B | $G_2$ | B | $G_2$ | B | $G_2$ | B | $G_2$ |
| $G_1$ | R | $G_1$ | R | $G_1$ | R | $G_1$ | R | $G_1$ | R | $G_1$ | R |
| B | $G_2$ | B | $G_2$ | B | $G_2$ | B | $G_2$ | B | $G_2$ | B | $G_2$ |

Fig.6 : *Bayer image*

| RGB | RGB | RGB | RGB | RGB | RGB | RGB | RGB | RGB | RGB | RGB | RGB |
|---|---|---|---|---|---|---|---|---|---|---|---|
| RGB | RGB | RGB | RGB | RGB | RGB | RGB | RGB | RGB | RGB | RGB | RGB |
| RGB | RGB | RGB | RGB | RGB | RGB | RGB | RGB | RGB | RGB | RGB | RGB |
| RGB | RGB | RGB | RGB | RGB | RGB | RGB | RGB | RGB | RGB | RGB | RGB |
| RGB | RGB | RGB | RGB | RGB | RGB | RGB | RGB | RGB | RGB | RGB | RGB |
| RGB | RGB | RGB | RGB | RGB | RGB | RGB | RGB | RGB | RGB | RGB | RGB |
| RGB | RGB | RGB | RGB | RGB | RGB | RGB | RGB | RGB | RGB | RGB | RGB |
| RGB | RGB | RGB | RGB | RGB | RGB | RGB | RGB | RGB | RGB | RGB | RGB |

Fig.7 : *color space image*

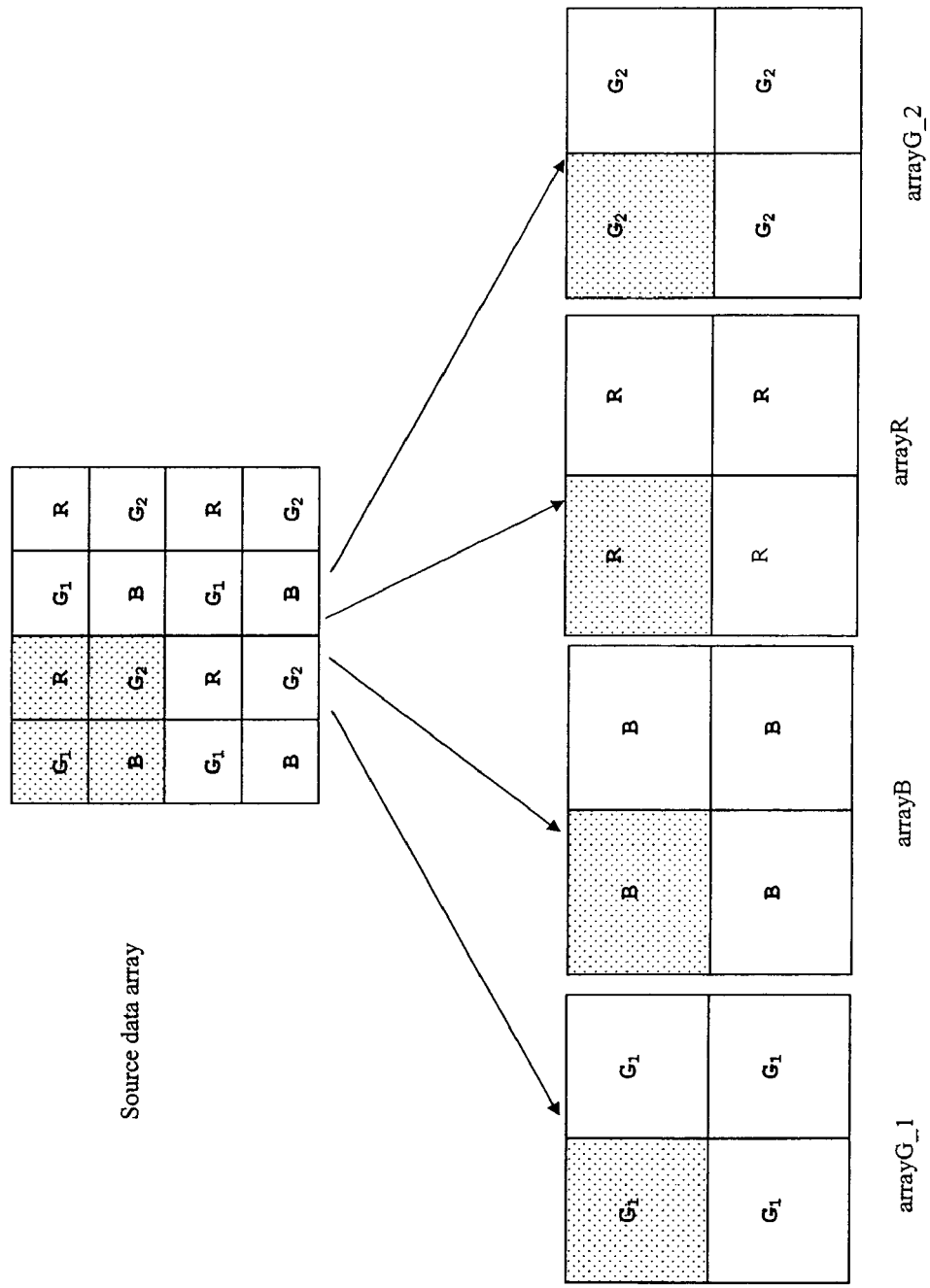
Fig.8: intermediate data array generation

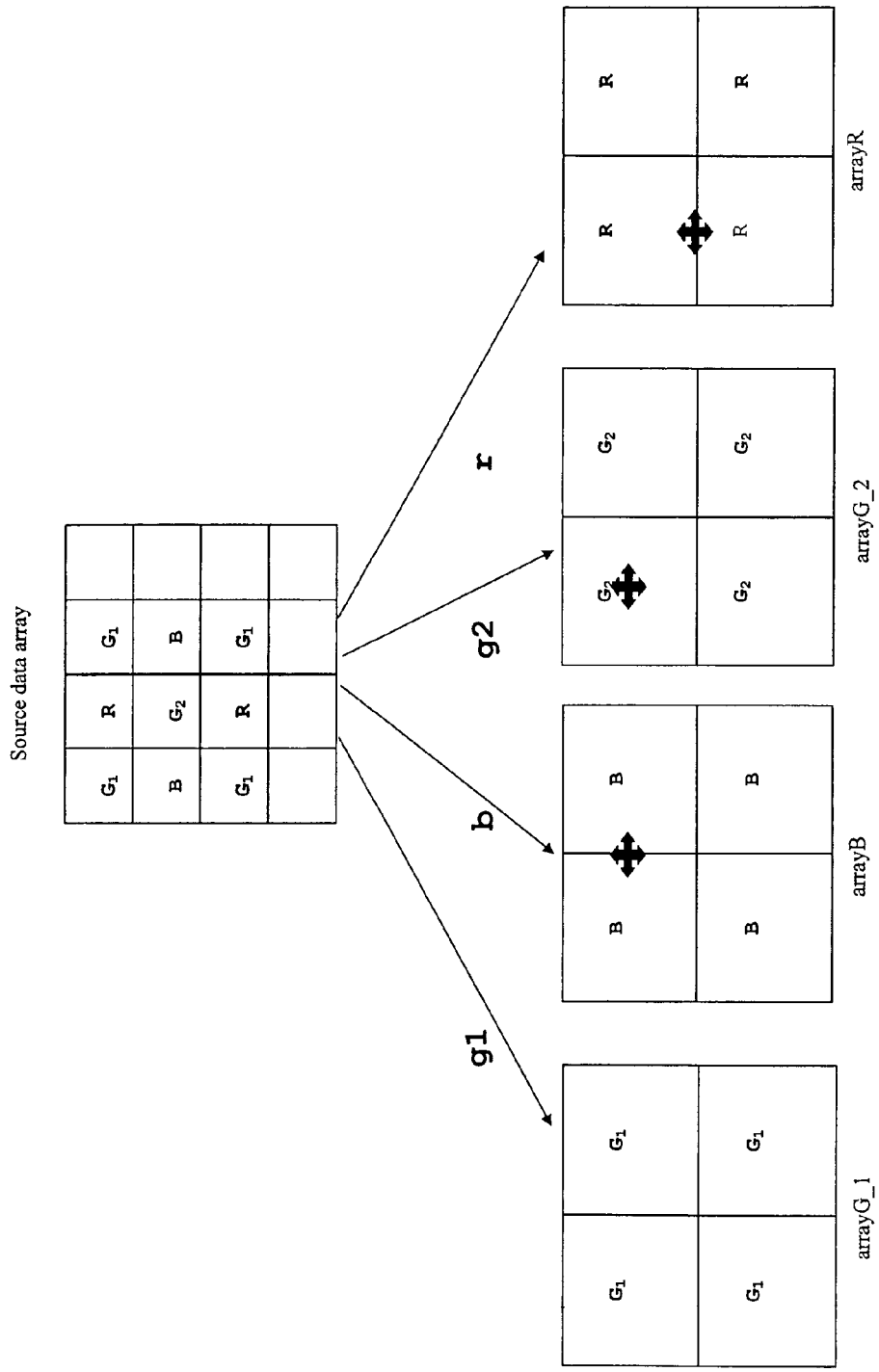
Fig.9: fetch color components for Green 2 source array element

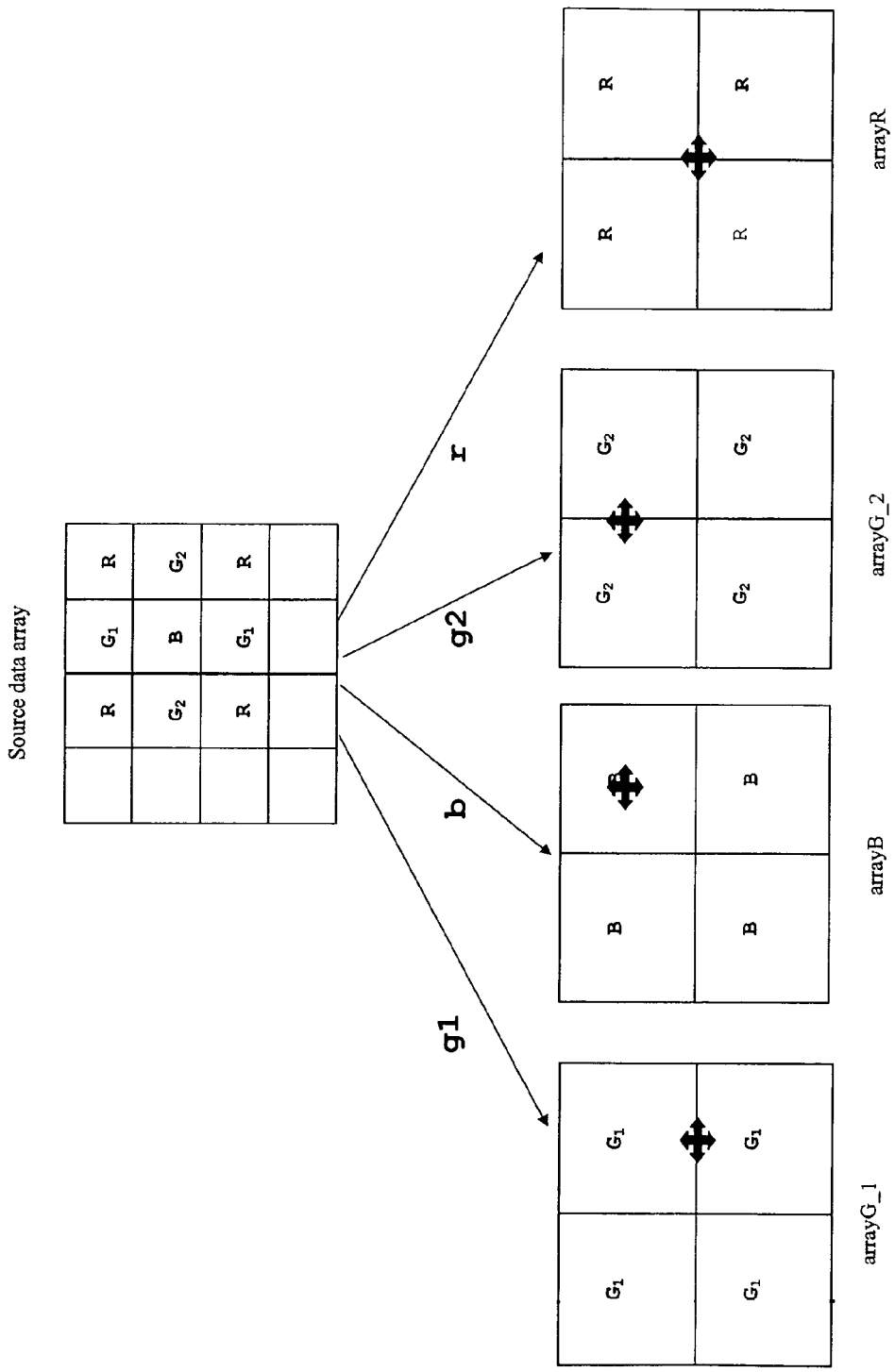
Fig.10: fetch color components for Blue source array element

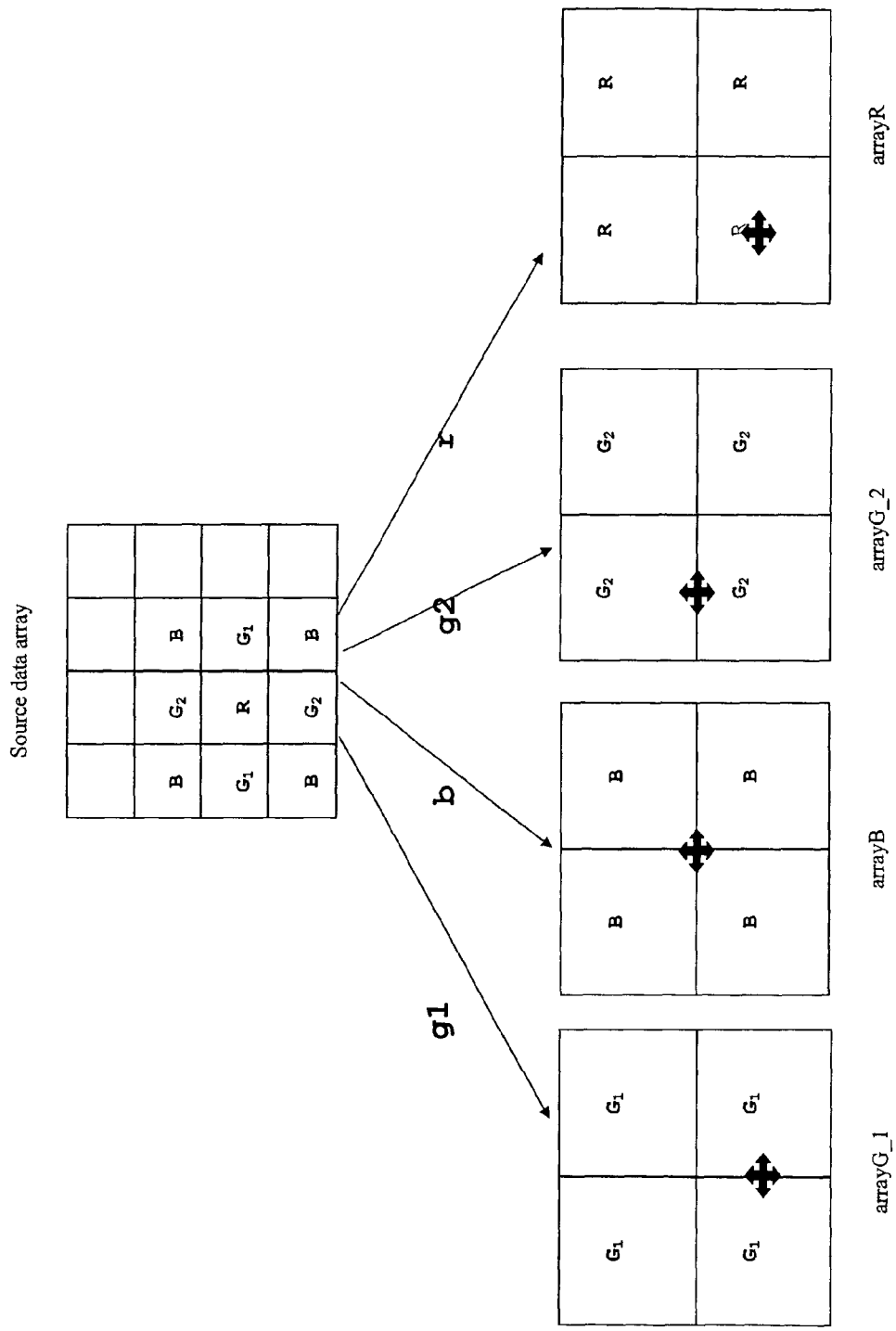
Fig.11: fetch color components for Red source array element

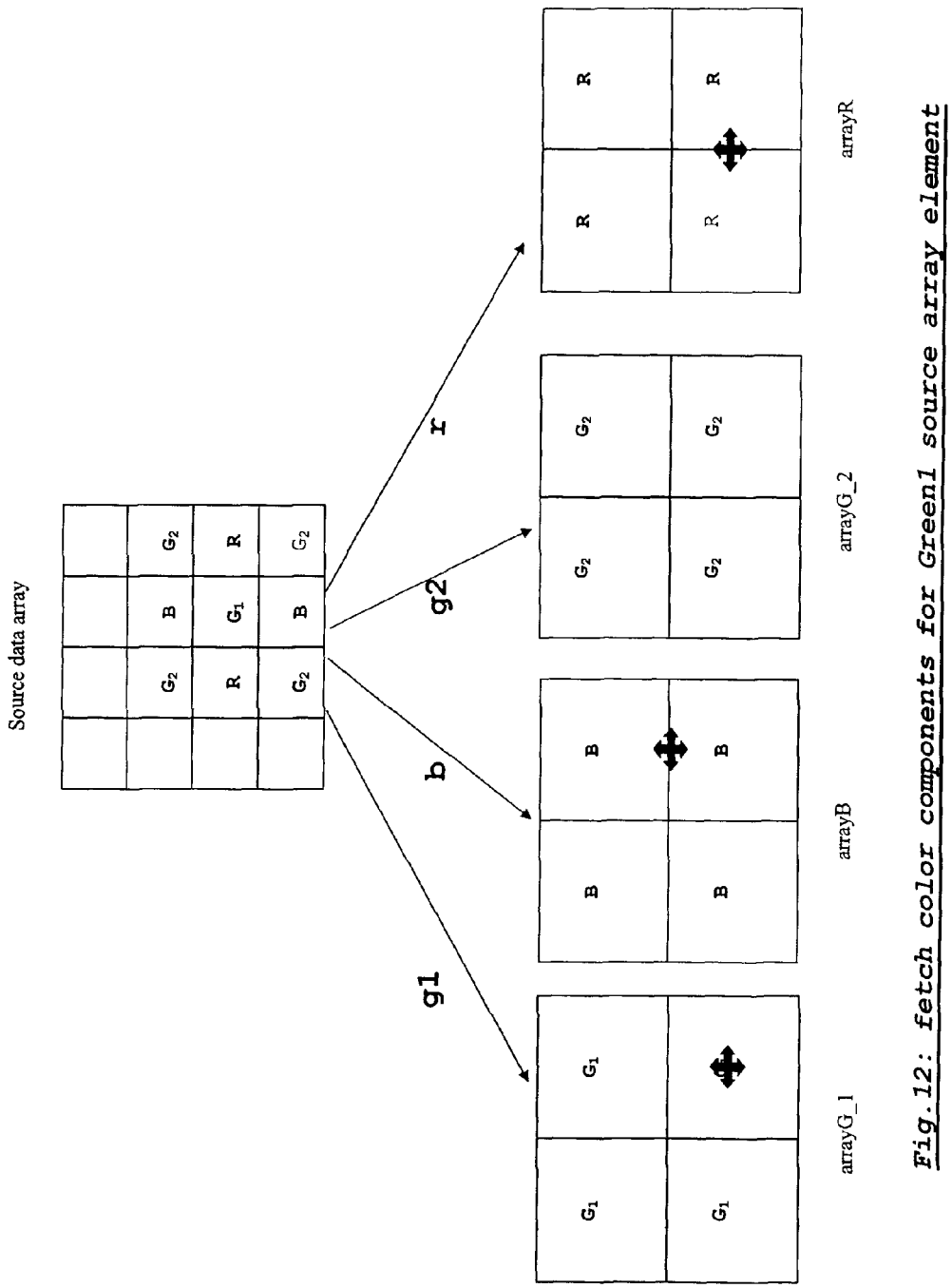
Fig.12: fetch color components for Green1 source array element

| $G_1$ | R | $G_1$ | R |
|---|---|---|---|
| B | $G_2$ | B | $G_2$ |
| $G_1$ | R | $G_1$ | R |
| B | $G_2$ | B | $G_2$ |

Coding

| 0 | 255 | 0 | 255 |
|---|---|---|---|
| 255 | 160 | 255 | 160 |
| 0 | 255 | 0 | 255 |
| 255 | 160 | 255 | 160 |

*Fig.13: Generation of Bayer code data array*

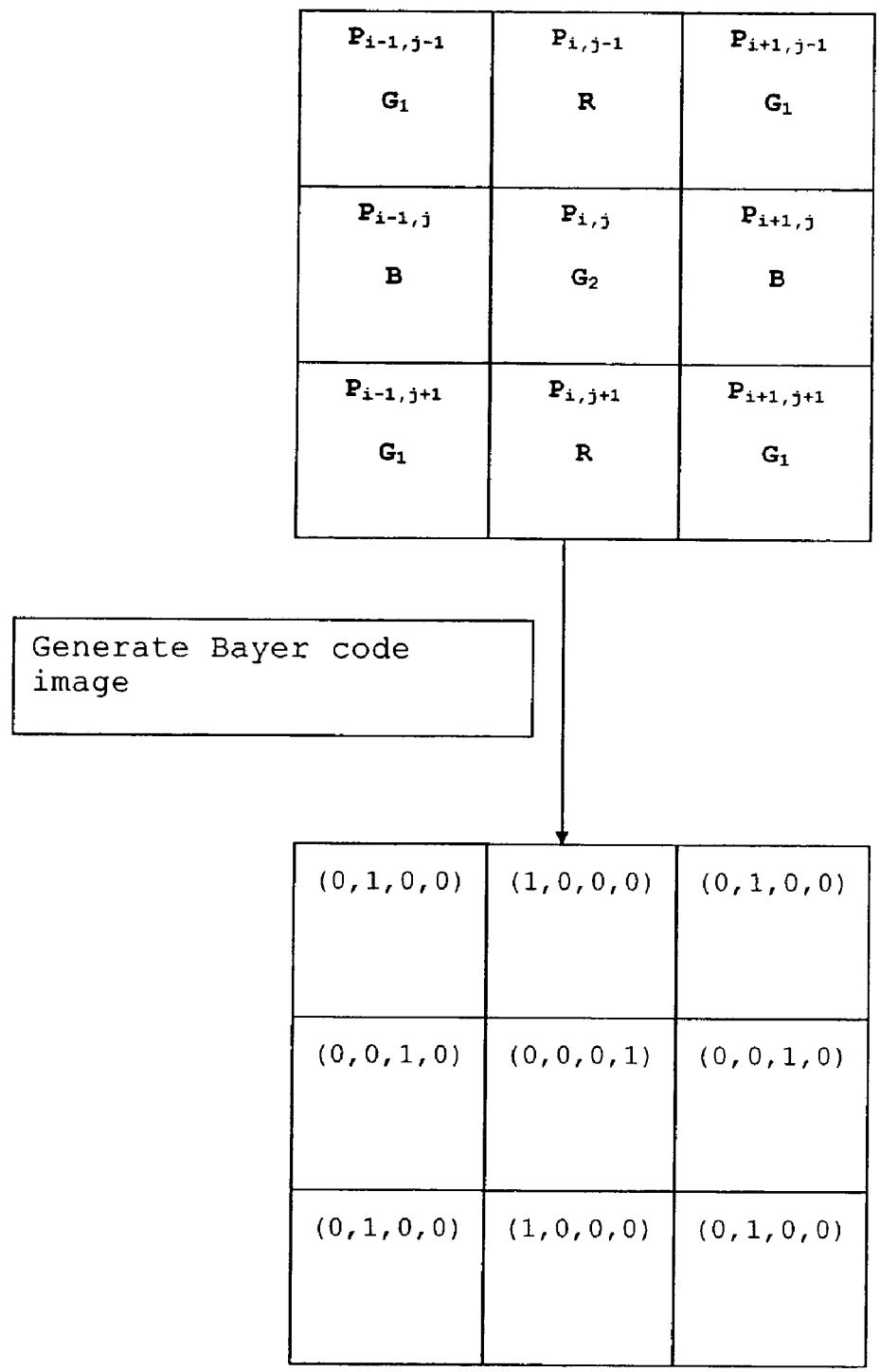
Fig.14: generate Bayer Code image

BAYER IMAGE CONVERSION USING A GRAPHICS PROCESSING UNIT

The present application includes a computer program listing appendix in accordance with 37CFR§1.52(e), the content of which is hereby incorporated by reference. The copyright owner of the said listing has no objection to the facsimile reproduction by anyone of the patent document or disclosure, as it appears in the Patent and Trademark Office patent file or records, but reserves all other copyright rights.

TECHNICAL FIELD

The present invention relates in general to image processing. More specifically it relates to a method and apparatus for transforming a single-site color camera image (Bayer image) into a color space image.

BACKGROUND OF THE INVENTION

Color image acquisition systems are widespread nowadays. Several systems and methods are used to capture scenes and display images in color spaces. The cheapest color imaging sensors are those using a "single imaging site" (as described in the Bayer's patent, "Color imaging array" U.S. Pat. No. 3,971,065). A popular example of a single-site sensor is a Bayer sensor.

A Bayer acquisition system is a sensor system that captures scene information in the form of a color pattern. An image output by such a sensor is stored in a particular pattern format. This pattern is characterized by including on a first row of an image, alternating pixels of Red and Green, and then on a next row alternating pixels of Blue and Green. The pattern shown in FIG. 1 is repeated to fill the image.

An example of the Bayer pattern for the first 4 rows of pixels is shown in FIG. 2.

In this case, each pixel location contains a value for a single color only. It is to be mentioned that this pattern is an example of possible Bayer patterns. It is known in the art that several patterns can be used to capture scenes using a Bayer acquisition system, although the one described above is the most widespread.

This type of sensor is increasingly popular for the simple reason that they are cheap and extremely simple to construct and use.

However, with a Bayer acquisition system the image obtained is not in a friendly format to be processed or to be displayed. Classical image processing algorithms and display methods are applied to color space images. The image needs to be transformed from a Bayer image to a RGB, YUV or any other color space image.

The Bayer transformation consists of finding the missing information for each pixel according to the information provided by the Bayer image. A well-known method to get a color space image from a Bayer image is "near neighbor averaging" or "linear filtering". In this method, for each pixel location the missing color component is determined by averaging neighboring pixels that are associated with that missing color. For example, $P_{i,j}$ represents the value of the Green_2 pixel at position (i,j) as shown in FIG. 3. Values of red, green and blue colors need to be computed at this pixel position.

The three color values are computed as follows:

$$\begin{cases} R_{i,j} = (P_{i,j-1} + P_{i,j+1})/2 \\ G_{i,j} = P_{i,j} \\ B_{i,j} = (P_{i-1,j} + P_{i+1,j})/2 \end{cases} \quad \text{Equation 1}$$

Where $X_{i,j}$ is the value of color X at position (i,j).

Similarly, if the pixel color is different the equations are different.

The case where at position (i,j) the color is Green_1:

$$\begin{cases} R = (P_{i-1,j} + P_{i+1,j})/2 \\ G = P_{i,j} \\ B = (P_{i,j-1} + P_{i,j+1})/2 \end{cases} \quad \text{Equation 2}$$

The case where at position (i,j) the color is Red:

$$\begin{cases} R = P_{i,j} \\ G = (P_{i,j-1} + P_{i,j+1} + P_{i-1,j} + P_{i+1,j})/4 \\ B = (P_{i-1,j-1} + P_{i+1,j-1} + P_{i-1,j+1} + P_{i+1,j+1})/4 \end{cases} \quad \text{Equation 3}$$

The case where at position (i,j) the color is Blue:

$$\begin{cases} R = (P_{i-1,j-1} + P_{i+1,j-1} + P_{i-1,j+1} + P_{i+1,j+1})/4 \\ G = (P_{i,j-1} + P_{i,j+1} + P_{i-1,j} + P_{i+1,j})/4 \\ B = P_{i,j} \end{cases} \quad \text{Equation 4}$$

The Bayer transformation is an essential operation, which cannot be avoided. It is often performed directly in camera systems or on boards containing dedicated hardware elements specifically designed for that purpose. These specialized hardware element are expensive and cannot be used for anything else than a Bayer transform. Other methods use the CPU to perform this transformation. However, in spite of its essential character, the Bayer transform is only a preprocessing operation and its result is often used to do more complex computations. It would be interesting then, to off-load the CPU and use it for other computations.

SUMMARY OF THE INVENTION

The invention disclosed herein is a method for transforming a Bayer image into a color space image without using any dedicated hardware and by off-loading the CPU. The invention uses a GPU to perform a Bayer transformation in order to obtain rapidly an image ready to be processed or displayed.

The invention provides a method for loading an image and instructions in a GPU local memory and performing a Bayer transformation using the GPU texture mapping capabilities to output an image in a desired color space. By using the GPU, the invention permits the user to exploit the advantages of Bayer systems without their inconveniences. In fact, the CPU is off-loaded and can be used to do more complex processing with the output image (edge extraction, pattern matching . . . ), and there is no need for any specialized hardware.

According to the invention, there is provided a method for converting a single-site color camera image to a color space image. A single-site color camera image has a plurality of colors with each pixel corresponding to a photosite of one of the colors and a remainder of the colors located at neighboring photosites. The method according to the invention comprises loading the single-site color camera image into a graphics processing unit (GPU) having a texture engine, and loading into the GPU commands to cause the texture engine to use the single-site color camera image as a source texture and to compute, for each pixel in a destination image having same dimensions as the single-site color camera image, interpolated neighbor pixel values from the single-site color camera image for the remainder of the colors. The destination image is then the color space image.

In the case that the GPU texture engine does not have branching capabilities or a modulo operator, the invention provides for the use of a code image (or code images, if required) so that differences in computation as a function of source pixel position are provided. In one embodiment, intermediate images for each source color are generated. In another embodiment, the interpolated neighbor pixel values are calculated and stored in registers for use in determining the current destination image pixel value.

BRIEF DESCRIPTION OF THE DRAWINGS

The invention will be better understood by way of the following detailed description of a preferred embodiment with reference to the appended drawings, in which:

FIG. 1 is a diagram of a Bayer pattern;
FIG. 2 is a diagram of a Bayer image;
FIG. 4 is a schematic diagram of illustrating texture mapping;
FIG. 5 is a schematic diagram of a GPU having a texture engine;
FIG. 6 is a diagram of a conventional Bayer image having Green1 and Green2 source colors;
FIG. 7 is a diagram of a conventional RGB color space image;
FIG. 8 is a diagram illustrating generation of intermediate images of half-dimensions for each source color component, namely Green1, Blue, Red and Green2 according to a first preferred embodiment;
FIG. 9 is a diagram illustrating fetches used for the destination R,G,B pixels of a Green2 source texture pixel according to a first preferred embodiment;
FIG. 10 is a diagram illustrating fetches used for the destination R,G,B pixels of a Blue source texture pixel according to a first preferred embodiment;
FIG. 11 is a diagram illustrating fetches used for the destination R,G,B pixels of a Red source texture pixel according to a first preferred embodiment;
FIG. 12 is a diagram illustrating fetches used for the destination R,G,B pixels of a Green1 source texture pixel according to a first preferred embodiment;
FIG. 13 is a diagram illustrating the generation of a code data array or image for one destination color component;
and
FIG. 14 is a diagram illustrating a code image used in a second preferred embodiment.

DETAILED DESCRIPTION OF THE INVENTION

Introduction

Figure 3:
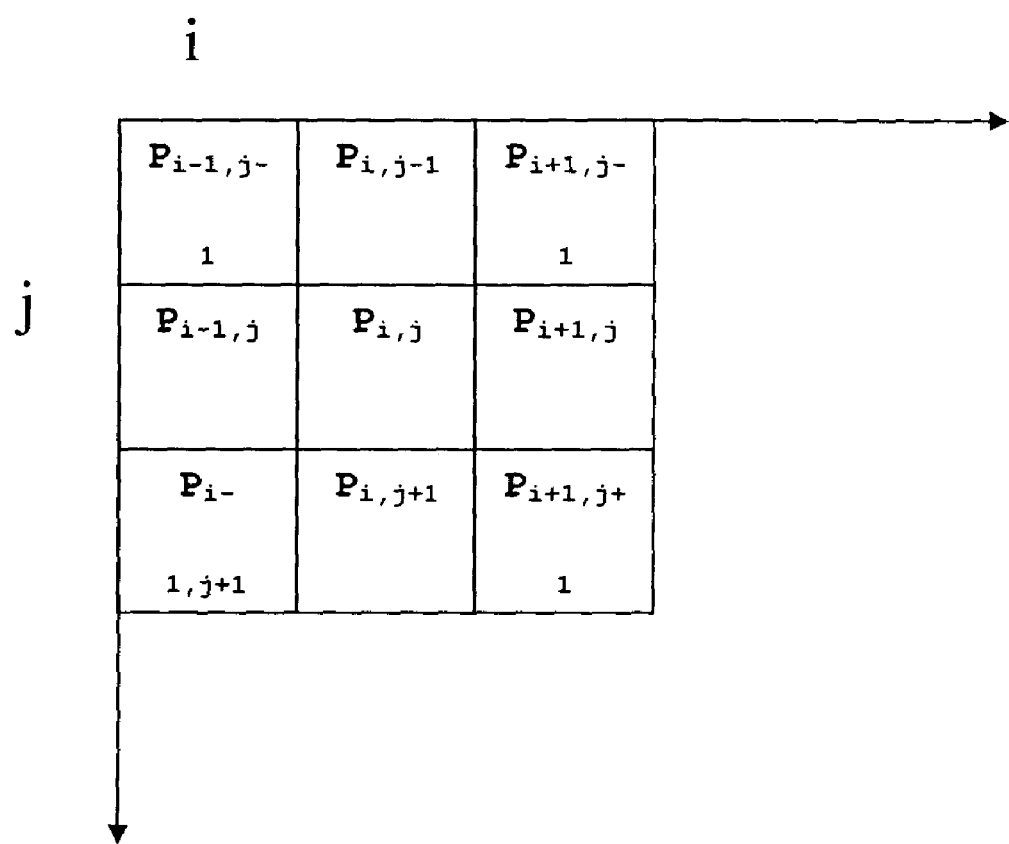
FIG. 3 is a diagram of pixel addressing in (i,j) coordinates.

The invention provides a solution to the problem of using expensive dedicated hardware or CPU to perform a basic operation, the Bayer transform. This solution is to use a GPU.

A GPU (graphical processing unit) is an image array processor with texture mapping capabilities. A texture map associates a destination data array with one or more source data array by computing each destination array element according to destination array element position and source arrays elements. FIG. 4 illustrates an example where a destination array element $Y_{i,j}$ is computed according to corresponding source array element $X_{i,j}$ and its neighboring source elements. The function that calculates a destination element can include basic mathematic functions like interpolation, addition, multiplication, minimum, maximum, etc.

The GPU was originally designed as an alternative to the CPU to process 3D graphics transformations. It is a single-chip processor associated with memory that creates lighting effects and transforms objects in 3D scenes. Traditionally GPUs are used essentially in the video game industry, the movie industry, three-dimensional video, and sophisticated scientific/engineering graphics programs. GPU's are constructed to perform rapidly "expensive" operations on 3D objects. In fact, a GPU is provided with parallel processing units, which allow it to perform complex computations in a short amount of time.

FIG. 5 shows a typical design of a GPU as will be familiar to a person skilled in the art. Components 21,22,25,26,27 are parts of the GPU integrated circuit. The GPU contains a memory element 27, which is used to store input data and output data after processing. AGP is a computer interface that allows fast access to RAM.

The main component of the GPU is the texture engine 21. This component contains pixel and vertex shader.

The vertex shader 23 is a programmable component. It can execute a series of arithmetic operations on data primitives. The user defines these instructions (arithmetical operations as multiplications and additions, loads and writings from internal registers). Typically data primitives are triangles, line segments or points.

The pixel shader is also a programmable component. It executes on pixels a series of arithmetic operations, defined by the user. These pixels result from the rasterization operation of the transformed data primitives, output by the vertex shader. The rasterization is performed either in the pixel shader or by a separate GPU component (not shown) the rasterizer. Here we assume that this component is part of the pixel shader. It is used to transform the primitives output by the vertex shader to a pixel representation, which will allow the display of the image.

The GPU contains a display engine 25. It processes the data in the GPU memory to convert it to a digital or analog signal that can be displayed on TV screens and computer monitors.

The GPU also includes, in the preferred embodiment, an acquisition device 26, which allows the GPU to obtain images directly from a camera without using the CPU or the AGP.

The invention provides a method for transforming a Bayer image into a color space image using the image processing capabilities of the GPU.

The method involves loading a Bayer image and instructions in GPU local memory and performing a Bayer transformation using the GPU texture mapping capabilities to output an image in a desired color space.

In what follows, two preferred embodiments of the invention are described. These examples are provided to illustrate the invention and should not be considered as limiting its scope. In both embodiments of the invention the Bayer pattern is the classical "G_1-R-B-G_2" as shown in FIG. 6 and the color space is RGB space as shown in FIG. 7. However this should not be seen as a limitation to the invention but only an example, which illustrates it clearly.

A First Method:

In a preferred embodiment of the invention the Bayer image and instructions are first loaded in GPU local memory.

A Bayer image is stored as a data array (source data array) and intermediate data arrays are generated by performing simple GPU operations on the source data array. Then for each array element of a destination data array a color space representation is computed using the GPU texture mapping abilities and the five intermediate data arrays described below.

First a Bayer image and instructions are loaded in GPU local memory. The instructions loaded provide GPU commands to perform a Bayer transform on the input image. Then five intermediate data arrays are computed using simple functionality of the GPU. Four of them are sub-sampled arrays of the source data array, namely arrayR, arrayB, arrayG_1, and arrayG_2. Each one contains all source array elements of the same color. Such sub-sampling is a simple scaling function normally used to scale down images, and is performed using the texture engine.

The GPU is programmed to create data arrays with dimensions half the size of the source data array. The sub-sampling method is set to "nearest point" and with texture mapping coordinates associating the "leftmost topmost" array element of the sub-sampled data array to the "leftmost topmost" array element of the selected color in the source data array. FIG. 8 illustrates the transformation performed to generate these intermediate data arrays.

In this preferred embodiment, to create each intermediate data array, texture mapping is performed. First, a texture is allocated in the GPU memory. Its width ($W_{inter}$) and height ($H_{inter}$) dimensions (expressed in array elements) are set to half the associated dimensions of the source data array ($W_{source}$ and $H_{source}$).

Then, the source data array is set as the source texture for texture mapping and the newly allocated texture is set as the render target of the texturing operation.

The next step is to create a vertex buffer containing the vertices $V_i(x_i, y_i)$ for two triangles that together will fill the render target. For each vertex, destination and source addresses must be determined. The transformed vertices coordinates (i.e. destination addresses in render target pixel units) are set to $V_0(x_0=-0.5, y_0=-0.5)$, $V_1(x_1=W_{inter}-0.5, y_1=-0.5)$, $V_2(x_2=W_{inter}-0.5, y_2=H_{inter}-0.5)$ $V_3(x_3=-0.5, y_3=H_{inter}-0.5)$. In order to prevent any depth clipping in the GPU, for each vertex, the required z position is set to +0.5 and the reciprocal homogeneous w to +1.0.

Moreover for each vertex position $(x_i,y_i)$ the addresses of the element that will be fetched by the texture engine must be defined. A texture address associated with each vertex indicates the address of the source element to be fetched by the GPU texture engine. These texture addresses are the following: $V_0(tu=0+\Delta u, tv=0+\Delta v)$, $V_1(tu=1+\Delta u, tv=0+\Delta v)$, $V_2(tu=1+\Delta u, tv=1+\Delta v)$, $V_3(tu=0+\Delta u, tv=1+\Delta v)$. These values are in accordance with the convention that a 2D texture addressing uses an address range of [0,1] in each dimension. The values of $\Delta u$ and $\Delta v$ depend of the type of pixel selected. In case where the pixel types are located in the original Bayer image according to FIG. 6 (G1,R,G2,B), the following values are used.

| | |
|---|---|
| Red | $\Delta u = -0.5/W_{source}, \Delta v = +0.5/H_{source}$ |
| Green_1 | $\Delta u = -0.5/W_{source}, \Delta v = -0.5/H_{source}$ |
| Green_2 | $\Delta u = +0.5/W_{source}, \Delta v = +0.5/H_{source}$ |
| Blue | $\Delta u = +0.5/W_{source}, \Delta v = -0.5/H_{source}$ |

In this preferred embodiment, in order to create the desired intermediate data array the texture mapping engine of the GPU is set to do nearest point filtering when fetching data from the source texture.

At this step, if a correction is required (a color gain and/or a gamma correction) for the extracted color, a palette is filled with the gain and the alpha correction results for each possible value in the source image. And the GPU is programmed to use this palette.

Then, a command is sent to the GPU to draw the two triangles defined in the vertex buffer. This operation will fill intermediate data arrays with the elements of the desired Red, Blue, Green_1 or Green_2 type.

These steps are repeated for each color and at the end of these preprocessing steps four color texture are generated.

Once these preprocessing steps are performed, data array elements are processed. For each destination array element we look for the three color values R, G and B. These values are an interpolation of well-chosen neighbors. As it was shown previously according to the color of the source array element the values of R, G and B are a different combination of specified neighbors (equations 1,2,3,4).

Intermediate data arrays are used to extract R, G and B values for each destination array element. FIG. 9 illustrates for an array element at position (i,j) in source data array the positions in intermediate data arrays of Red, Blue and Green components sampled. In this figure, when the sampling position is between two elements of the array, an interpolation is done between the two elements. In this example the source array element is Green_2. We recall that for a data array element Green_2, the following averages needs to be computed:

$$(i, j) \begin{cases} R = (P_{i,j-1} + P_{i,j+1})/2 \\ G = P_{i,j} \\ B = (P_{i-1,j} + P_{i+1,j})/2 \end{cases}$$

Then, for the first Green_2 element of the output image, the value of the red component is the average of the two first elements of the first column of the Red intermediate data array. The value of the blue component is the average of the first two elements of the first row of the Blue intermediate data array. And the green value is the first element of the Green_2 intermediate data array. FIG. 10, FIG. 11 and FIG. 12, show the corresponding values for Green_1, Red, and Blue.

In this preferred embodiment, this step involves in combining the data from all the arrays to form the final color image. The GPU is programmed to fetch data from the four textures containing the separate color types (arrayR, arrayB, arrayG_1, and arrayG_2). To obtain the color values for each array element, the GPU does a fetch in the intermediate data arrays at positions computed using the position of the array element in the final color data array and using a supplied constant offset for each intermediate array. The GPU is configured such that it performs the appropriate interpolation in case the fetching position in the intermediate array falls between many array elements.

The fetched values from the Red and Blue intermediate data arrays can be used directly to fill the associated components of the final color data array. However, the GPU should distinguish three cases to fill the green component, according to the type of this array element in the source Bayer array:

If the source array element is Green_1 then the GPU chooses the value fetched from the Green_1 array.

If the source array element is Green_2 then the GPU chooses the value fetched from the Green_2 array.

If the source array element is Red or Blue then the GPU uses the average between the fetched values from Green_1 and Green_2 arrays.

To help the GPU to differentiate between these three cases, it is fed with another intermediate data array named Bayer code data array. In this array, each element contains information about the array element color at the associated position in the source data array.

In this preferred embodiment several steps are followed to perform the color combining operation. In a first step, the Bayer code data array is created. An 8-bit texture is allocated in the GPU memory. Its width and height dimensions (expressed in array elements) are set to the same dimension as the source Bayer data array ($W_{source}$ $H_{source}$).

This texture is filled with the following values: 255 if the associated array element in the source array is of type Red or Blue, 0 if the associated array element is of type Green_1 and 160 if the associated array element is of type Green_2. FIG. 13 illustrates this transformation. The same process as described previously is used to compute the result array: texture mapping. A destination data array is allocated as a surface in the GPU memory. Its width and height dimensions (expressed in array elements) are set to the same dimension as the source Bayer data array ($W_{source}$ and $H_{source}$). Then this surface is set as the render target of the texturing operation.

In this case the four intermediate data textures and the Bayer code data array are set as source textures for texture mapping.

A vertex buffer is created; it contains the vertices $V_i(x_i,y_i)$ of two triangles that will fill the render target. For each vertex, destination and source addresses must be determined. The transformed vertices coordinates (i.e. the addresses of target elements in render target pixel units) should be $V_0(x=-0.5, y=-0.5)$ $V_1(x=W_{source}-0.5, y=-0.5)$, $V_2(x=W_{source}-0.5, y=H_{source}-0.5)$ $V_3(x=-0.5, y=H_{source}-0.5)$. For each vertex, the required z position is set to +0.5 and the reciprocal homogeneous w to +1.0 in order to prevent any depth clipping in the GPU.

Moreover for each vertex position $(x_i,y_i)$ the addresses of the element that will be fetched by the texture engine must be defined. At this step, for each rendered array element of the destination surface the texture engine will fetch a value from each intermediate data array (arrayR, arrayB,) arrayG_1, and arrayG_2) and from the Bayer code data array (BC). These texture addresses are the following, ($\Delta U=1/W_{source}$, $\Delta v=1/H_{source}$):

|    | $V_0$ | $V_1$ | $V_2$ | $V_3$ |
|----|-------|-------|-------|-------|
| R  | $(0 + \Delta u, 0 - \Delta v)$ | $(1 + \Delta u, 0 - \Delta v)$ | $(1 + \Delta u, 1 - \Delta v)$ | $(0 + \Delta u, 1 - \Delta v)$ |
| G1 | $(0 + \Delta u, 0 + \Delta v)$ | $(1 + \Delta u, 0 + \Delta v)$ | $(1 + \Delta u, 1 + \Delta v)$ | $(0 + \Delta u, 1 + \Delta v)$ |
| G2 | $(0 - \Delta u, 0 - \Delta v)$ | $(1 - \Delta u, 0 - \Delta v)$ | $(1 - \Delta u, 1 - \Delta v)$ | $(0 - \Delta u, 1 - \Delta v)$ |
| B  | $(0 - \Delta u, 0 + \Delta v)$ | $(1 - \Delta u, 0 + \Delta v)$ | $(1 - \Delta u, 1 + \Delta v)$ | $(0 - \Delta u, 1 + \Delta v)$ |
| BC | $(0, 0)$ | $(1, 0)$ | $(1, 1)$ | $(0, 1)$ |

This texture addressing will map each pixel of the destination data array (destination surface) to positions in the intermediate data arrays that will either correspond directly to the needed data or that will fall between the values that need to be averaged according to the equations 1, 2, 3 and 4.

In order to fetch the right values for each destination position the texture mapping engine of the GPU needs to be programmed to do bilinear filtering. This will ensure that the appropriate average will be done when fetching a value at a position located between many pixels of the intermediate data arrays.

Moreover, texture mapping engine must be set to perform mirror address overscan when the fetching position corresponds to a position outside an intermediate data texture. This will insure the correctness of the result at the border of the destination image.

Once the fetch addresses are set, the pixel shader is programmed to compute for each destination array element, its color components R, G and B. In fact for each destination array the pixel shader fetches the values from the four intermediate data arrays and from the Bayer code array. Then, it computes the average of fetched values from Green_1 and Green_2 arrays and chooses the appropriate value for Green component according to the Bayer code. This code has been translated and scaled from the [0,255] range to [−1,1]. The pixel shader chooses the value of Green 1 if the scaled code<0, the value of Green_2 if 0<=scaled code<0.5, and the average of Green_1 and Green 2 if the scaled code>=0.5. Finally the pixel shader assigns the Red and Blue components output values directly from the values fetched from the associated intermediate data arrays.

The last step is to send a command to the GPU to draw the two triangles defined in the vertex buffer. This operation will fill the destination data array with the desired R,G and B values for each array element.

This preferred embodiment method is fast and easy to implement using a DirectX 8.1 API. It uses GPU characteristics such as texture engine and texture mapping. The C++ code in the listing appended hereto can be executed to perform the above method as well as the below second method.

A Second Method:

In another preferred embodiment, the same primary steps are performed. A Bayer image and instructions are loaded in the GPU local memory. Image is processed and a color space image is output.

The Bayer image is loaded in a 2D source data array in GPU local memory. An intermediate Bayer code data array is generated according to the source data array. As in the previous embodiment of the invention this data array contains information about the source array elements' type. though, this information is not coded in the same manner. In this embodiment a distinction between the four possible cases needs to be done.

A texture mapping operation is performed to generate the Bayer code data array. The source texture is the Bayer image and the destination texture is the Bayer code data array. In this embodiment, each Bayer code array element's value is either (1,0,0,0) if the source element is Red, (0,1,0,0) if the source element is Green_1, (0,0,0,1) if the source element is Green_2 or (0,0,1,0) if the source element is Blue as shown in FIG. 14.

In the next step, the color data array is computed. The source data array and the Bayer code data array are set as source textures of the GPU and a surface is allocated in GPU local memory to hold the output color data array. This surface has the same width and height dimensions (expressed in array elements) as the source Bayer data array ($W_{source}$ and $H_{source}$).

The allocated destination surface is set as the render target of the texture engine of the GPU. Then, a vertex buffer is created containing the vertices $V_i(x_i, y_i)$ for two triangles that together will fill the render target. And as in the previous method the destination addresses must be defined. The transformed vertices coordinates (i.e. in render target pixel units) are set to $V_0(x_0=-0.5, y_0=-0.5), V_1(x_1=W_{source}-0.5, y_1=-0.5)$ $V_2(x_2=W_{source}-0.5, y_2=H_{source}-0.5)$, $V_3(x_3=-0.5, y_3=H_{source}-0.5)$. In order to prevent any depth clipping in the GPU, for each vertex, the required z position is set to +0.5 and the reciprocal homogeneous w to +1.0.

For each vertex, texture addresses are also defined. Texture addresses are the addresses of the source and Bayer code element that must be fetched to compute the desired R,G and B value for each destination array element. The texture addresses are: $V_0(tu=0, tv=0)$, $V_1(tu=1, tv=0)$, $V_2(tu=1, tv=1)$, $V_3(tu=0, tv=1)$.

The GPU uses this vertex buffer for its rendering operation and it is programmed to use nearest point filtering when fetching values from input textures.

As in the first embodiment of the invention it is essential to note that each array element's color value searched is a combination of appropriate source array elements' values. Let $P_{i,j}$ be the color value at pixel position (i,j). Once the Bayer code array is generated the texture engine computes for each destination array element the following averages:

$$\begin{cases} \text{right-left} = \dfrac{P_{i-1,j} + P_{i+1,j}}{2} \\ \text{up-down} = \dfrac{P_{i,j-1} + P_{i,j+1}}{2} \\ \text{diagonal} = \dfrac{P_{i-1,j-1} + P_{i+1,j-1} + P_{i-1,j+1} + P_{i+1,j+1}}{4} \\ \text{cross} = \dfrac{P_{i,j-1} + P_{i+1,j} + P_{i,j+1} + P_{i-1,j}}{4} \\ \text{center} = P_{i,j} \end{cases}$$

We note that if the color is red at pixel location (i,j), we would like to associate to each color Red, Blue, Green the following values:

$$(i,j) \begin{cases} \text{Red} = \text{center.} \\ \text{Green} = \text{cross} \\ \text{Blue} = \text{diagonal} \end{cases} \text{Combination 1}$$

If the color is Blue:

$$(i,j) \begin{cases} \text{Red} = \text{diagonal} \\ \text{Green} = \text{cross} \\ \text{Blue} = \text{center} \end{cases} \text{Combination 2}$$

If the color is Green_1:

$$(i,j) \begin{cases} \text{Red} = \text{left-right} \\ \text{Green} = \text{center} \\ \text{Blue} = \text{up-down} \end{cases} \text{Combination 3}$$

If the color is Green_2:

$$(i,j) \begin{cases} \text{Red} = \text{up-down} \\ \text{Green} = \text{center} \\ \text{Blue} = \text{left-right} \end{cases} \text{Combination 4}$$

In this preferred embodiment, the pixel shader is programmed such that it performs the following operations for each array element of the destination surface.

First, it fetches the Bayer code from the Bayer code data array at the position corresponding to the destination array element position and stores this code in an internal register of the pixel shader.

Then, it fetches the value from the source data array at the same position and stores it in an internal register of the pixel shader.

In the next step, the texture fetching position is modified by adding offsets corresponding to the distance between pixels and the values of the 8 neighbor array elements are fetched. All these values are stored in internal registers of the pixel shader:

The pixel shader computes the average values left-right, up-down, diagonal, cross, center and stores the four possible averages combinations (1,2,3,4).

However, only one of these combinations is the right one. To select it, each combination is multiplied by one element of the corresponding Bayer code and the results are added. Since only one component of this code is 1 and the others are 0, the result of the sum of these multiplications is immediately the right combination.

A command is sent to the GPU to draw the two triangles defined in the vertex buffer using the instructions stored in its pixel shader. This operation will fill the color data array.

At this step the three values R, G and B are determined for the destination array element at position (i,j).

This embodiment uses less GPU local memory but does more computation for each array element. Both embodiments off-load the CPU, which can be dedicated to more complex tasks.

It will be appreciated that if the GPU has a modulo operator, .it is possible to use the current pixel index, e.g. i,j, in combination with such an operator to effectively create the code "on the fly" and thus avoid the need to provide the code. For example, (i MOD 2) will be zero for even values of i and one for odd values of i, while ((i+1) MOD 2) will have the opposite values. Equivalently, if a GPU has the ability to perform a bitwise logical AND, it will be appreciated that (i AND 1) will yield a value of one for all odd values of i and zero for all even values, while ((i+1) AND 1) will yield one for all even values of i and zero for all odd values. The code is essentially a product of such an odd/even function of both the i and j indices, since there are the four position in the Bayer pattern as illustrated in FIG. 1. Conventional GPU's today do not include such modulo operators. Similarly, when a GPU is able to perform a branch operation, the need to use a code or such an operator can be avoided.

What is claimed is:

1. A method for processing a single-site color camera image having a plurality of colors with each pixel corresponding to a photosite of one of said colors and a remainder of said colors located at neighboring photosites, the method comprising:
converting the single-site color camera image to a color space image using a Graphics Processing Unit (GPU) having a texture engine by:
loading the single-site color camera image into the GPU, the GPU being an image array processor with texture mapping capabilities; and
loading into said GPU commands to cause the texture engine to use the single-site color camera image as a source texture and to compute, for each pixel in a destination image having same dimensions as the single-site color camera image, interpolated neighbor pixel values from the single-site color camera image for the remainder of said colors, said destination image being said color space image;

accessing the color space image by a Central Processing Unit (CPU); and processing the color space image using the CPU, wherein a code image is provided, said code image providing, for each pixel in said destination image, a value for each combination of color space image color and each single-site color camera image color, each said pixel in said destination image being computed as a sum of a product of each said code image value and a corresponding value selected from corresponding source texture pixels and an interpolation of neighboring source texture pixels.

2. The method as claimed in claim 1, wherein said GPU texture engine has no branching capability and no modulo operator.

3. The method as claimed in claim 1, wherein said GPU samples said source texture to generate intermediate monochrome images for each of said plurality of colors.

4. The method as claimed in claim 3, wherein said interpolation of neighboring source texture pixels is performed by sampling said intermediate monochrome images between pixels so as to fetch an average value of neighboring pixels.

5. The method as claimed in claim 4, wherein said plurality of colors comprises Green1, Red, Blue and Green2, and said intermediate monochrome images have dimensions one-half that of said source texture.

6. The method as claimed in claim 5, wherein for Red and Blue source texture pixels, said interpolation for blue and red pixel values, respectively, involves fetching from said source texture at a boundary between four pixels.

7. The method as claimed in claim 5, wherein for Red and Blue source texture pixels, green pixel values are determined by an average of fetched values from said intermediary images for said Green1 and said Green2.

8. The method as claimed in claim 1, wherein said code image originates outside of said GPU and is loaded into said GPU.

9. The method as claimed in claim 1, wherein said code image is generated in said GPU by instructions loaded into said GPU.

10. The method as claimed in claim 1, wherein for each pixel in said destination image, said GPU:
computes average values of neighboring pixels along predetermined axes in said source texture, stores said average values in corresponding registers;
computes products of each said code image value and a corresponding value selected from the corresponding source texture pixels and one of said registers; and
computes a sum of said products as a value for each said pixel in said destination image.

11. The method as claimed in claim 10, wherein said registers comprise four interpolated values corresponding to up-down, left-right, forward diagonal and backward diagonal.

12. The method as claimed in claim 11, wherein said plurality of colors comprises Green1, Red, Blue and Green2, and green pixels in said destination image corresponding to Red and Blue pixels in said source texture being computed from an average of said up-down and left-right interpolated values.

13. A method for processing a single-site color camera image having a plurality of colors with each pixel corresponding to a photosite of one of said colors and a remainder of said colors located at neighboring photosites, the method comprising:
converting the single-site color camera image to a color space image using a Graphics Processing Unit (GPU) having a texture engine by:
loading the single-site color camera image into the GPU, the GPU being an image array processor with texture mapping capabilities;
loading into said GPU commands to cause the texture engine to use the single-site color camera image as a source texture and to compute, for each pixel in a destination image having same dimensions as the single-site color camera image, interpolated neighbor pixel values from the single-site color camera image for the remainder of said colors, said destination image being said color space image; and
creating a vertex buffer containing vertices for at least one triangle that covers said destination image; accessing the color space image by a Central Processing Unit (CPU); and
processing the color space image using the CPU;
wherein for each pixel in said destination image:
computing average values of neighboring pixels along predetermined axes in said source texture, storing said average values in corresponding registers; and selecting from one of a corresponding source texture pixel and said registers a value for each said pixel in said destination image using the GPU.

14. The method of claim 13, wherein said converting the single-site color camera image to a color space image comprises creating texture addresses that indicate addresses of source elements to be fetched by the texture engine.

* * * * *